United States Patent [19]
Ikeda

[11] 3,738,732
[45] June 12, 1973

[54] MULTI-LAYER ANTIREFLECTION COATING

[75] Inventor: Hideo Ikeda, Kamakura, Japan
[73] Assignee: Nippon Kogaku K.K., Tokyo, Japan
[22] Filed: Oct. 6, 1970
[21] Appl. No.: 78,389

[30] Foreign Application Priority Data
Oct. 9, 1969  Japan.................................. 44/80371

[52] U.S. Cl............................... 350/164, 117/33.3
[51] Int. Cl.................................................. G02b 1/10
[58] Field of Search ......... 350/1,163–166; 117/33.3

[56] References Cited
UNITED STATES PATENTS

| | | | |
|---|---|---|---|
| 3,235,397 | 2/1966 | Millendorfer | 350/164 |
| 3,463,574 | 8/1969 | Bastien et al. | 350/164 |
| 3,565,509 | 2/1971 | Sulzback | 350/164 |
| 3,432,225 | 3/1969 | Rock | 350/164 |

FOREIGN PATENTS OR APPLICATIONS
921,751  3/1963  Great Britain...................... 350/164

*Primary Examiner*—Ronald L. Wibert
*Assistant Examiner*—Ronald J. Stern
*Attorney*—Ward, McElhannon, Brooks & Fitzpatrick

[57] ABSTRACT

A quasi-symmetrical three-layer coating of a desired equivalent refractive index N having a wide dispersion effect in the regions adjacent to the visible region is presented. The coating consists of various substances deposited in vacuum in a stable manner. One layer of a quasi-symmetrical three-layer coating is substituted by a glass to be coated. When the glass to be coated has not the refractive index of 1.52 or 1.74, a suitable layer $\lambda/4$ in thickness is coated over said glass.

7 Claims, 28 Drawing Figures

(a)

ONLY MgF2 λ/4 LAYER ng=1.52

(b)

CENTRAL WAVE LENGTH
λ=λs(500mμ)

(a)

THREE LAYERS

TWO LAYERS

WAVE LENGTH 400mμ

(b)

WAVE LENGTH 600mμ

(c)

WAVE LENGTH 700mμ

—— INSERTING SECOND LAYER OF $\frac{\lambda}{2}$, n=2.0
---- INSERTING SECOND LAYER OF $\frac{\lambda}{2}$ WITH MOST APPROPRIATE n
--- POSSIBILITY OF IRI< 0.3%

WAVE LENGTH 400 mµ

—— INSERTING SECOND LAYER OF $\frac{\lambda}{2}$, n=2.0
——— INSERTING SECOND LAYER OF $\frac{\lambda}{2}$ WITH MOST APPROPRIATE n
——— POSSIBILITY OF |R|<0.3%

WAVE LENGTH 600mμ

— INSERTING SECOND LAYER OF $\frac{\lambda}{2}$, n=2.0
—·— INSERTING SECOND LAYER OF $\frac{\lambda}{2}$ WITH MOST APPROPRIATE n
—··— POSSIBILITY OF IRI<0.3%

WAVE LENGTH 700 mµ

$ng - \frac{\lambda}{4} - \underline{\frac{\lambda}{2} - \frac{\lambda}{2} - \frac{\lambda}{2}} - \frac{\lambda}{4} - AIR$ ----- SYMMETRIC THREE-LAYER FILM (REPLACED BY EQUIVALENT FILM)
——— QUASI SYMMETRIC THREE-LAYER FILM (QUASI EQUIVALENT FILM)

$ng - \frac{\lambda}{4} - \underline{\frac{\lambda}{4} - \frac{\lambda}{4} - \frac{\lambda}{2}} - \frac{\lambda}{4} - AIR$ WAVE LENGTH 400mμ

WAVE LENGTH 700mμ

——— $ng - \frac{\lambda}{2} - \frac{\lambda}{2} - \frac{\lambda}{4}$ - AIR
- - - - $ng - \frac{\lambda}{2} - \frac{\lambda}{4}$ - AIR

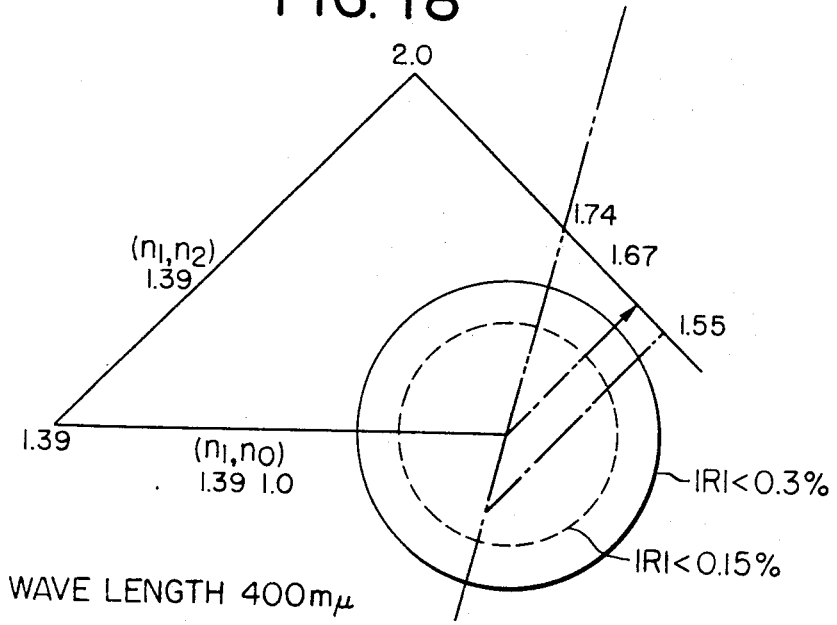
FIG. 18
WAVE LENGTH 400mμ
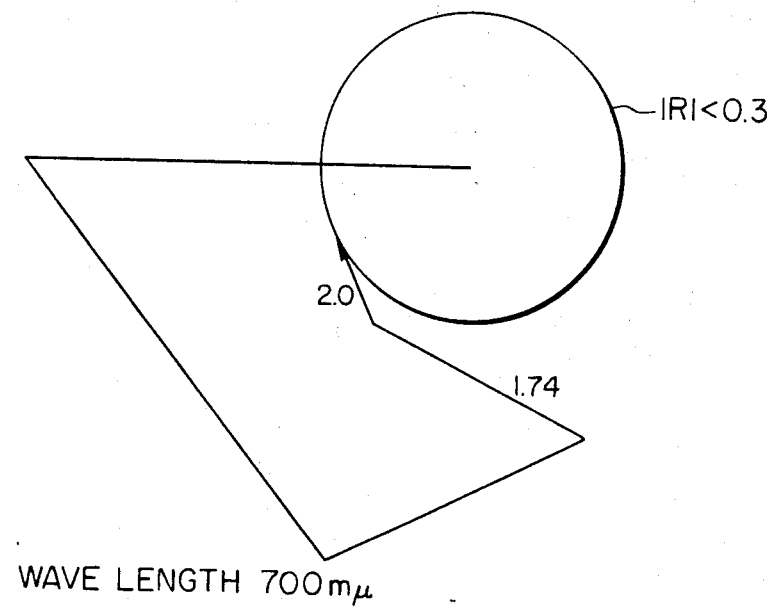
WAVE LENGTH 700mμ

3,738,732

MULTI-LAYER ANTIREFLECTION COATING

FIELD OF INVENTION

This invention relates to a multi-layer antireflection layer.

DESCRIPTION OF PRIOR ARTS

One of the prior art antireflection layers is a single-layer coating of MgF$_2$ with an optical thickness of λ/4 ( See FIG. 1 ). In case of a glass to be coated having a high refractive index, there has been used a double-layer coating ( See FIG. 2 ) whose layer λ/2 in thickness which attains the equivalent effect as that of the MgF$_2$ single-layer coating relative to a central wavelength is interposed between the glass and MgF$_2$ layer so that the reflectivity at light wavelengths other than the central wavelength in the visible region may be reduced. From FIGS. 1 and 2, it is seen that the reflectivity curves are extremely in V- and W-shaped forms so that these antireflection coating are not satisfactory in view of the spectral characteristics in the visible region. To overcome this problem, the U.S. Pat. Nos. 2,478,385 and 3,185,020 disclose a ng-λ$_s$/4 -λ$_s$/2-λ$_s$/4- air type antireflection coating and A.F. Turner introduced a ng - ¾λ$_s$-λ$_s$/2-λ$_s$/4- air type three-layer antireflection coating. Moreover, Hass proposed a ng - λ$_s$/4-λ$_s$/4-λ$_s$/2-λ$_s$/4λ/4 - air type four-layer antireflection coating while the U.S. Pat. No. 3,235,397 discloses also a four-layer antireflection coating concisting only of the layers less than λ/4 in thickness.

However, these antireflection coatings have the following problems:

1. the problem of production, that is, it is impossible to obtain a substance to be vacuum deposited which has a desired refractive index or such substance which is stable chemically and physically;
2. the problem of not sufficiently low reflectivity in the regions less than 4,200A. and higher than 6,500A. in the visible region;
3. the problems brought about when a glass blank having a refractive index of the order of 1.6, etc.

SUMMARY OF THE INVENTION

One of the objects of the present invention is therefore to provide an antireflection coating which is stable physically and chemically and which has a substantially flat reflective index less than 0.2 - 0.3 percent in the visible region( 4,000A - 7,000A.) that is which is transparent ( acromatic ) in the visible region.

DESCRIPTION OF THE DRAWING

FIG. 10 is a block diagram illustrating the design of a first embodiment of the present invention wherein, FIG. 10(a) shows a diagram of coating layers and lists the conditions at 600 mµ as in FIG. 6, and FIG. 10(b) shows a diagram of coating layers and lists the conditions at 400 mµ as in FIG. 5 or 700 mµ in FIG. 7;

FIG. 18 is a diagram illustrating by the vector method the reflectivity at 400 mµ and 700 mµ of the fifth embodiment of the present invention and its construction;

DESCRIPTION OF THE PREFERRED EMBODIMENTS

Figure 1:
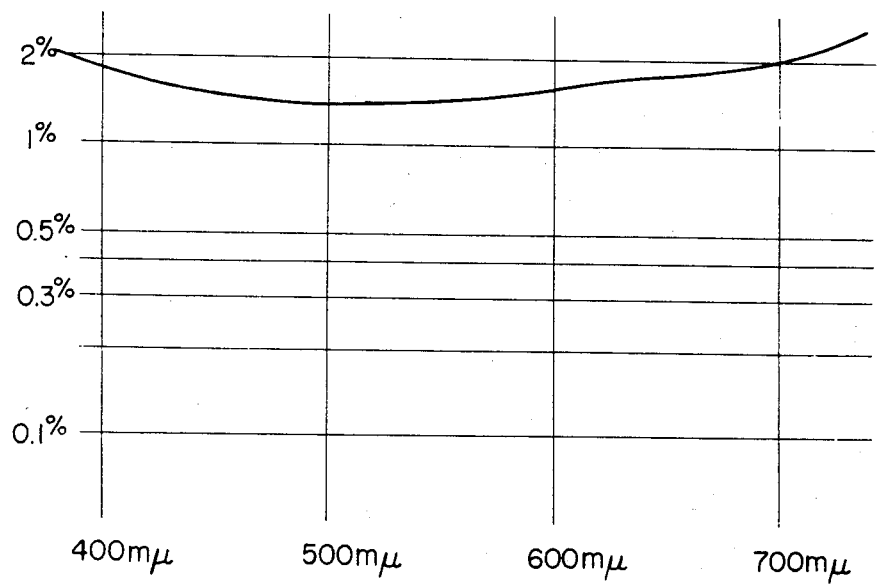
FIG. 1 is a graph of a spectral reflective-indexes of the prior single-layer antireflection coating made of MgF$_2$, that is ( ng λ/4 - air )

In general, the antireflection coatings are designed based on the conventional methods such as
1. the method of observation based upon the analysis conditions;
2. the method of employing graphical approximation, as in the case of the double- and three-layer antireflection coatings by A. F. Turner or employing the Vector system or the Smith's chart; and
3. the numerical calculation employing the design parameters such as refractive index, optical thickness of film, etc.

However, these methods are inconvenient and not satisfactory to discuss the effect of the three-layer or four-layer antireflection coating in the whole visible region. In other words, these methods are only effective when the reflectivity at the central wavelength $\lambda_s$ or a specific wavelength is studied.

The inventor therefore took a consideration of the effects of antireflection coating not only in the region near the central wavelength but also the regions of wavelengths shorter and longer than the central wavelength. More specifically, the inventor employed first the conventional method (2) for obtaining the fundamental observation, that is for obtaining a $MgF_2$ layer which is most stable physically and chemically and most effective layer between a medium and a glass for a specific wavelength or a number of waves. The antireflection coating is limited in its use in the visible region; the object of the analyses is directed to the effect over the whole visible region; and the problem of controlling the thickness of the coating in production must be taken into consideration so that the wave number region to be taken into consideration becomes within the region of $(1-\delta, 1+\delta)$
where $\delta = \max(\ |\lambda_s/\lambda_1 - 1|\ , |\lambda_s/\lambda_2 - 1|\ )$;
$\lambda_1 < \lambda_s < \lambda_2$; and
$\lambda_1$ and $\lambda_2$ = the upper and lower limits of wavelengths.
Therefore, the thickness of the coating will become
$\lambda_s/4 + k \cdot \lambda_s/2$ $(k = 0, 1, 2, \ldots)$
if the symmetrical effect is desired to the wave number 1 which is apparent from Herpin matrix $$M(\lambda) = \begin{pmatrix} \cos g & \frac{i}{n} \sin g \\ in \sin g & \cos g \end{pmatrix} \quad (1)$$

$$R = \frac{(1-\mu)^2 \cos^2 g + \left(\frac{\mu}{n} - n\right)^2 \sin^2 g}{(1+\mu)^2 \cos^2 g + \left(\frac{M}{n} + n\right)^2 \sin^2 g} \quad (2)$$

where $\mu$ = refractive index of glass;
$n$ = refractive index;
$g = 2\pi nd/\lambda_s \cdot \lambda_s/\lambda$;
$R$ = reflectivity;
$\lambda_s$ = central wavelength;
$nd/\lambda_s$ = thickness of coating; and
$\lambda$ = wavelength.

Next when the method (2) is used so that the reflectivity R to the central wavelength becomes less than 0.3 percent, a layer $\lambda/4$ in thickness of a substance having a refractive index between 1.6 and 1.8 such as $Al_2O_3$, CeF, etc., must be interposed between the $MgF_2$ layer and the glass. (See FIG. 3). (In this case, the refractive index of the glass is assumed 1.52).

Figure 4:
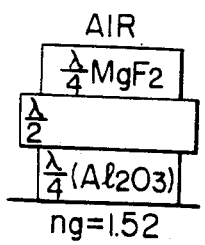
FIG. 4(a) shows in the vector method the reflectivity at the wavelength of 400 mµ of the double-layer coating presumed from FIG. 3(b) and the prior art three-layer coating for improving the defect of this double-layer coating.
FIG. 4(b) shows a vector representation of the reflectivity at the wavelength of 600 µ of the double-layer coating described with respect to FIG. 3(b)
FIG. 4(c) shows a vector representation of the reflectivity at the wavelength of 700 µ of the double-layer coating described with respect to FIG. 3(b)
Figure 4:
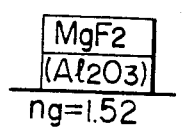
Figure 4:
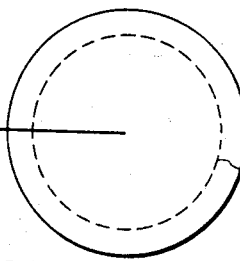
Figure 4:
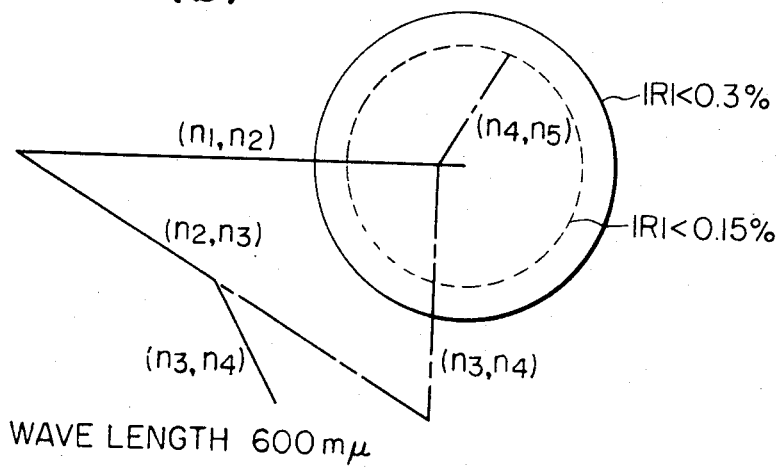
Figure 4:
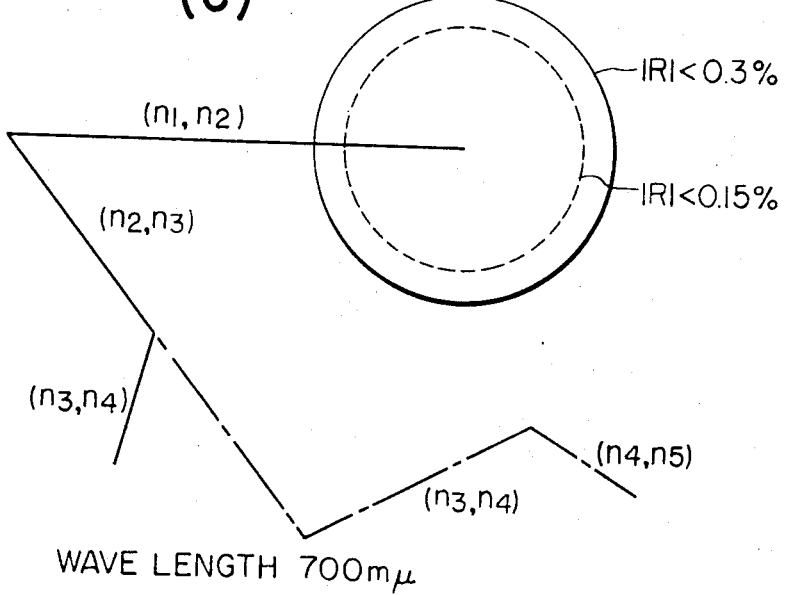

However, by the method (2) it is easily presumed that this double-layer antireflection coating has a spectral transmittance which will not satisfy the condition of reflectivity less than 0.3 percent to a specific wavelengths of for example 4,000 A., 6,000 A. and 7,000 A. (in this case, the central wavelength is assumed to have 5,000 A.). (See FIGS. 4(a), 4(b) and 4(c), solid lines).

To overcome this problem, there has been proposed to add a layer which has the antireflection effect gradually increased at the wavelengths other than the central wavelength in the visible region and which has no effect on the central wavelength. For instance, the U.S. Pat. No. 3,185,020 discloses the interposition of a layer $\lambda/2$ in thickness between a $MgF_2$ layer $\lambda/4$ in thickness and an $Al_2O_3$ layer in $\lambda/4$ in thickness. However, the antireflection coating is not yet satisfactory in the visible region as will be seen from FIGS. 4(a), 4(b), and 4(c), the dotted lines.

Figure 5:
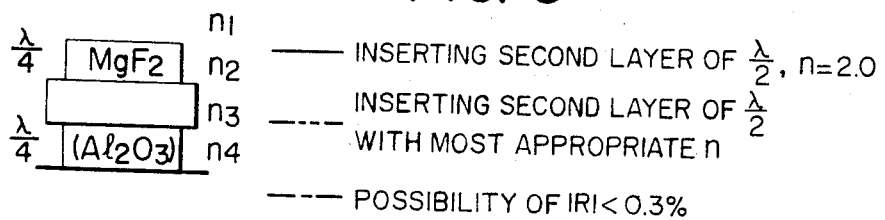
FIG. 5 shows by the vector method the conditions for reducing the reflectivity less than 0.3 percent at a wavelength for example 400 mµ in the visible region, the reflectivity of the prior art three-layer coating being shown by the solid line, the two-dot chain line (—··—··—) indicating the reflectivity of the three-layer coating when the refractive index of its middle layer is varied, and the broken line (—·—·—) indicating the reflectivity less than 0.3 percent without adversely affecting the central wavelength.
Figure 5:
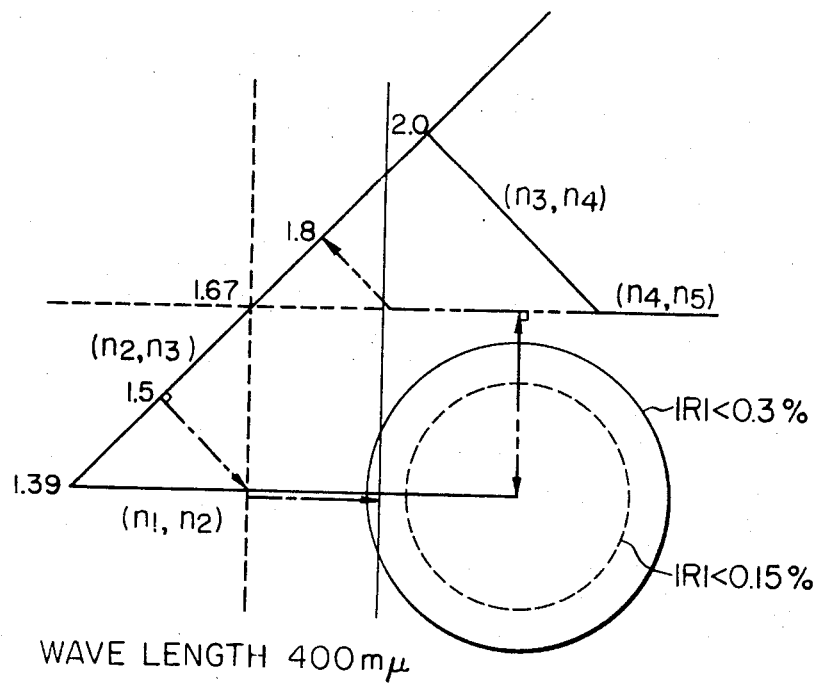
Figure 6:
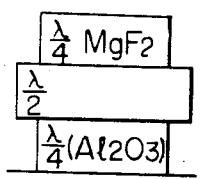
FIGS. 6 and 7 are views similar to FIG. 5, but at 600 and 700 mµ; the reflectivity of the prior art three-layer coating being indicated by the two-dot chain line (1) while the reflectivity of the three layer coating less than 0.3 percent obtained by varying the refractive index of the middle layer without adversely affecting the central wavelength being indicated by the broken line (2)
Figure 6:
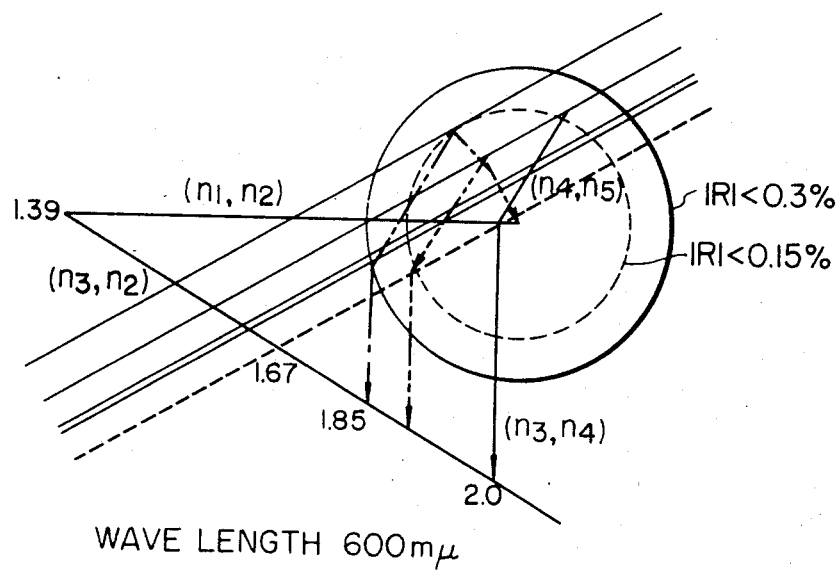
Figure 7:
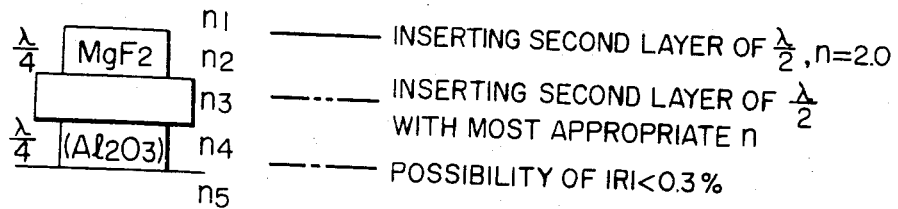
Figure 7:
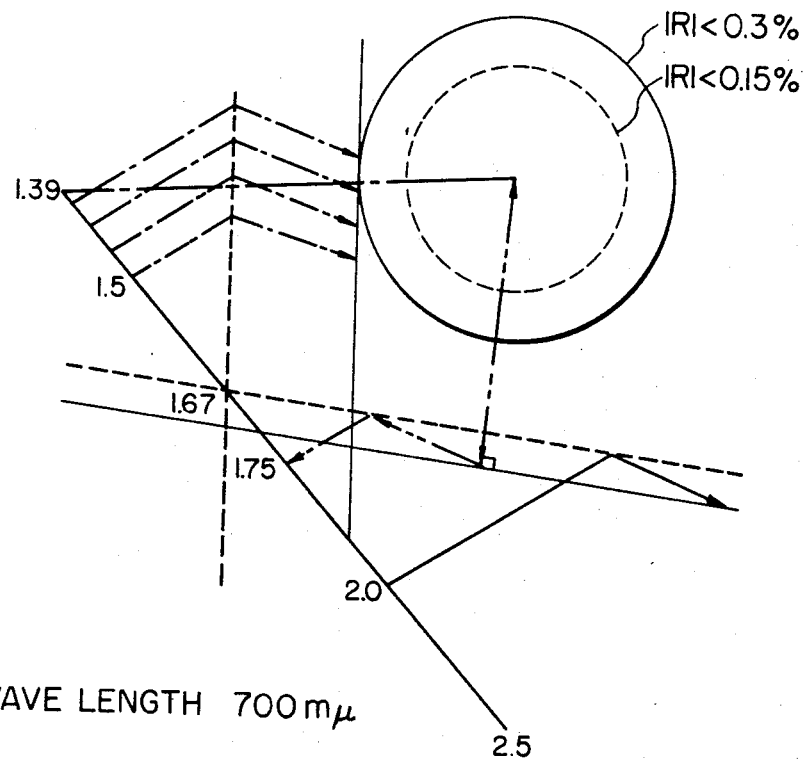

When it is desired to have the reflectivity of $|R| \leq 0.3$ percent at 4,000 A. and 7,000 A. and to further improve the reflectivity at 6,000 A., an intermediate layer and an additional layer which may be explained with reference to FIGS. 5, 6 and 7 are required. That is, it will be seen that a substance with a refractive index $n = 1.45 - 1.55$ optically $\lambda/2 + m\lambda$ (where $m = 1, 2, \ldots$) in thickness must be interposed between the $MgF_2$ layer $\lambda/4$ in thickness and the $AL_2O_3$ layer $\lambda/4$ in thickness over the glass for the wavelengths of 4,000 A. and 7,000 A. For the wavelength of 6,000 A. the refractive index of the intermediate layer $\lambda/2$ in thickness must be $1.9 - 2.0$ or a layer of a substance with a refractive index n and a thickness of $m\lambda$ (where $m = 1, 2, \ldots$) must be interposed between the glass and the first $AL_2O_3$ layer $\lambda/4$ in thickness. This is Example (1). Fore each wavelength, the refractive index as well as thickness of a layer must be widely varied. For instance even when the thickness remains unchanged it is next to impossible to find out a substance which may be used in practice to vary its reflective index for each wavelength. The same results are attained in thickness and refractive index of the third layer over the glass which has a desired reflectivity of $R < 0.3$ percent even when the first layer (whose adjacent medium is air) is $MgF_2$ $\lambda/4$ in thickness, the second layer $\lambda/2$ in thickness of a substance with a refractive index of 2.0 such as $ZnO_2$, $TiO_2$, $ThO_3$, etc., and the refractive index of the glass is 1.74. Therefore, there arises a difficult problem that a mixture layer must be provided to attain a refractive index from $1.8 - 1.9$ to the wavelengths outside the visible region and that said mixture layer must change its refractive index widely in the regions adjacent to the visible regions.

There has been known the theory of "equivalent coating or film," that is the theory that the symmetrical multi-layers may be substituted by a single layer coating for each wavelength.

The inventor has expanded this theory and found out the two remarkable fundamental characteristics of the thickness of the film when the properties of the third layer are utilized. Thus, the inventor succeeded in providing a desired antireflection coating.

The third layer may be expressed in terms of Herpin Matrix $$M = \begin{pmatrix} \cos g_1 & \frac{i}{n_1 + \Delta n} \sin g_1 \\ i(n_1 + \Delta n) \sin g_1 & \cos g_1 \end{pmatrix} \begin{pmatrix} \cos g_2 & \frac{i}{n_2} \sin g_2 \\ in_2 \sin g_2 & \cos g_2 \end{pmatrix}$$

$$\begin{pmatrix} \cos g_1 & \frac{i}{n_1} \sin g_1 \\ in_1 \sin g_1 & \cos g_1 \end{pmatrix} \quad (3)$$

where $g_i = 2\pi n d_i / \lambda_s \cdot \lambda_s / \lambda$
$i = 1, 2$
$n d_i / \lambda_s$ = optical thickness of a layer, $i = 1, 2$
$n_i$ = refractive index, $i = 1$ and $2$;
$\Delta_n$ = difference of indexes between asymmetrical components
$\lambda$ = wavelength; and
$\lambda_s$ = central wavelength.

Eq. (3) may be rewritten $$M \simeq \begin{pmatrix} \frac{n_1}{n_1 + \Delta n} & 0 \\ 0 & \frac{n_1 + \Delta n}{n_1} \end{pmatrix} \begin{pmatrix} \cos g_1 & \frac{i}{n_1} \sin g_1 \\ in_1 \sin g_1 & \cos g_1 \end{pmatrix}$$

$$\begin{pmatrix} \cos g_2 & \frac{i}{n_2} \sin g_2 \\ in_2 \sin g_2 & \cos g_2 \end{pmatrix} \begin{pmatrix} \cos g_1 & \frac{i}{n_1} \sin g_1 \\ in_1 \sin g_1 & \cos g_1 \end{pmatrix} \quad (4)$$

$$\begin{pmatrix} \frac{n_1}{n_1 + \Delta n} & 0 \\ 0 & \frac{n_1 + \Delta_n}{n_1} \end{pmatrix} \begin{pmatrix} \cos \circledH & \frac{i}{N} \sin \circledH \\ iN \sin \circledH & \cos \circledH \end{pmatrix} \quad (5)$$

where $N$ = equivalent refractive index;
$\circledH = 2\pi(ND/\lambda_s) \cdot (\lambda_s/\lambda)$
$ND/\lambda_s$ = equivalent thickness of a layer; and
$\Delta ND \lambda = [(2nd_1/\lambda_s) + (nd_2/\lambda_s)] - (ND/\lambda_s)$ Then $$\Delta ND\lambda = \left(2 - \left(\frac{n_2}{n_1} + \frac{n_1}{n_2}\right)\right) \sin 2g_1 \cdot \sin g_2 \quad (6)$$

and $$N - n_1 \left| \frac{n_1 n_2 \sin 2g_1 \cos g_2 + (n_2^2 \cos^2 g_1 - n_1^2 \sin^2 g_1) \sin g_2}{n_1 n_2 \sin 2g_1 \cos g_2 + (n_1^2 \cos^2 g_1 - n_2^2 \sin^2 g_1) \sin g_2} \right| \quad (7)$$

From Eqs. (6) and (7), it is seen that if the combination of layers $\lambda_s/2$ and $\lambda_s/4$ in thickness is used, the equivalent refractive index $N(\lambda)$ in the near-region including the central wavelength $(0.85 < \lambda_s/\lambda < 1.15)$ becomes substantially equal to that to the central wavelength and that the equivalent thickness becomes substantially $2(nd_1/\lambda_s) + (nd_2/\lambda_s)$
That is, $N(\lambda) \approx N(\lambda_s)$ (9)

where $0.85 \leq \lambda_s/\lambda \leq 1.15$
and $$Nd/\lambda_s = 2(nd_1/\lambda_s) + (nd_2/\lambda_s) \quad (10)$$

Figure 8:
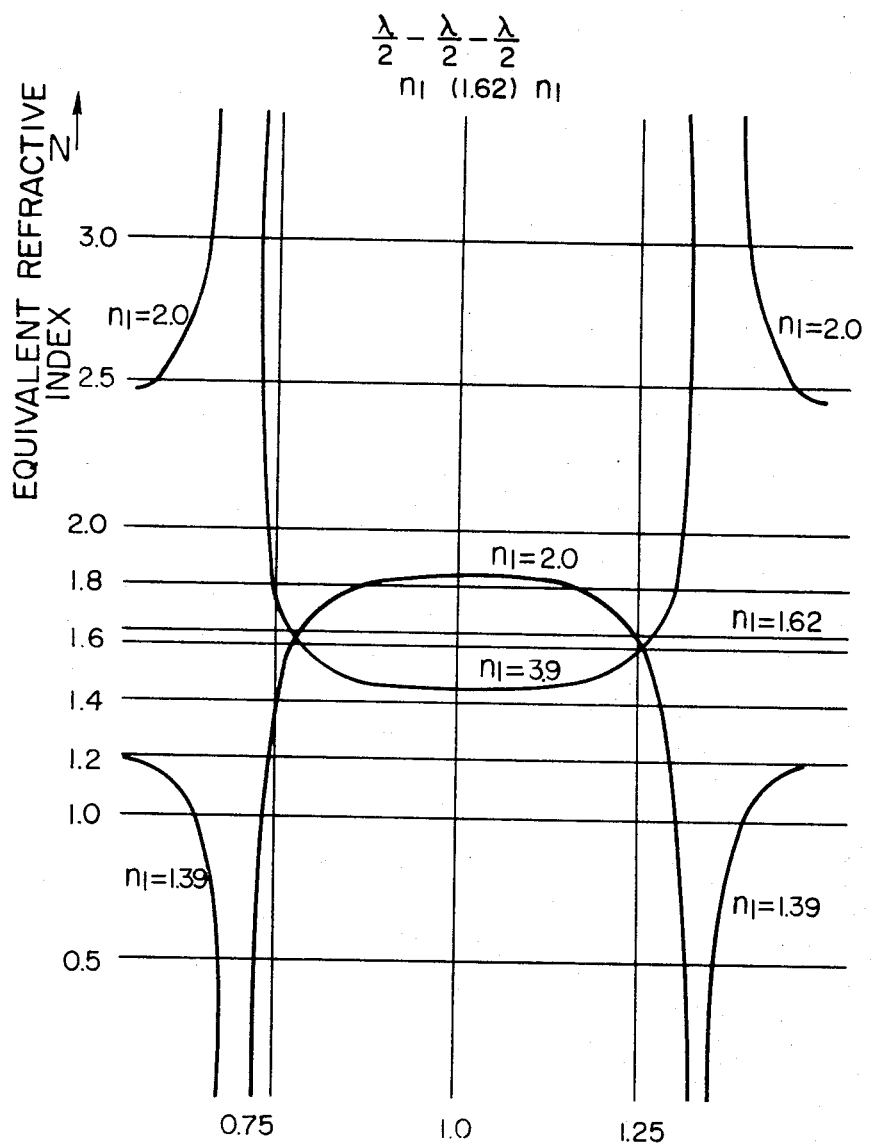
FIG. 8 is a graph of an equivalent refractive index to λs/λ of a symmetrical three-layer coating.
Figure 9:
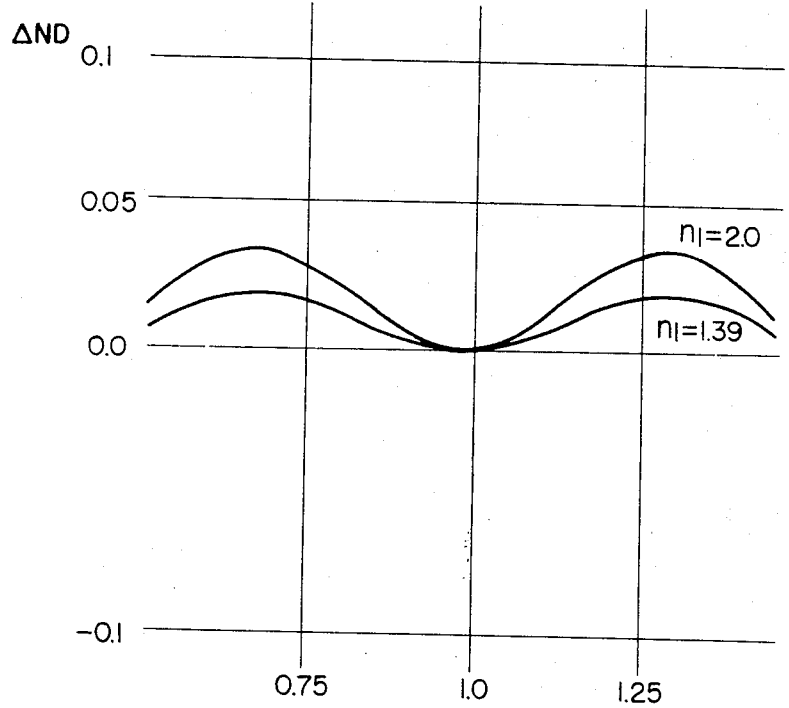
FIG. 9 is a graph of ΔND to λs/λ of a symmetrical three-layer coating.

On the other hand, the equivalent refractive index $N(\lambda)$ to the wavelength in the visible regions ($\lambda_s/\lambda < 0.8$ and $\lambda_s/\lambda > 1.2$) not including the central or middle wavelength is much deviated from $N(\lambda_s)$ and reaches a very great or small value. This is illustrated in FIGS. 8 and 9. That is, when the symmetrical third layer is analysed by the theory of "equivalent film," the refractive index $N$ having a wide variance in the regions adjacent to the visible region may be obtained. However, the symmetrical third layer made from a substance which is physically and chemically stable may not have a desired refractive index $N$.

To overcome this problem, in the process of the design of an antireflection coating in accordance with the present invention, asymmetry is introduced into the refractive index of the symmetrical three-layer coating. For the sake of convenience, this coating will be referred to as "quasi-symmetrical layer." Furthermore, the refractive index and thickness of this layer will be referred to as "quasi-equivalent refractive index $N^*$ and quasi-equivalent thickness $ND^*$" hereinafter. Assume that the equivalent refractive index and equivalent thickness of the symmetrical third layer $(n_1, n_1 d_1) - (n_2, n_2 d_2) - (n_1, n_1 d_1)$ are $N_1$ and $ND$ while the quasi-equivalent refractive index and quasi-equivalent thickness of the quasi-symmetrical three-layer coating $(n_1 + \Delta n, (n_1 + \Delta n)d') - (n_2, n_2 d_2) - (n_1, d_1)$ where $(n_1 + \Delta n)d' = n_1 d_1$ are $N^*$ and $ND^*$ respectively. Then, from Eq. (5)

$$N^* \approx N(1 + \Delta n/n_1) \quad (11)$$

and $$\cos \circledH^* \simeq \left(1 + \frac{\frac{(\Delta n)^2}{n_1}}{2\left(1 + \frac{\Delta n}{n_1}\right)}\right) \cos \circledH \quad (12)$$

where $\circledH^* = 2\pi(ND^*/\lambda_s) \cdot (\lambda_s/\lambda)$; and
$\circledH = 2\pi(ND/\lambda) \cdot (\lambda_s/\lambda)$ This shows that when the non-symmetrical condition $\Delta n$ is introduced into the symmetrical three-layer coating, the equivalent refractive index $N$ may be increased or decreased by $100(\Delta n/n_1)$ percent for each wavelength. For instance, when $n_1 = 2.0$ and $\Delta n = 0.1$, the equivalent refractive index for each wavelength may be increased by 5 percent. As to the thickness, it is seen from Eq. (6) that when $|\Delta n/n_1| < 0.15$ there arises no problem at all even if the quasi-equivalent thickness is assumed to be equal to the equivalent thickness $ND$ in the visible region. Thus, it is seen that the quasi-symmetrical three-layer coating is very effective to provide a desired refractive index $N'$ having a wide variance in the regions adjacent to the visible region.

FIRST EMBODIMENT

The first embodiment of the present invention will be described. If this is applied to Example (1) described hereinbefore a desired effect will be attained. In Example 1, the refractive index is 1.45 - 1.5 to the wavelengths of 4,000 A. and 7,000 A., the equivalent thickness $ND/\lambda_s = 3/2\cdot\lambda$ and a layer substantially $3/2\cdot\lambda$ in thickness to the central wavelength. This layer will become an absent layer in the near-region including the central wavelength and may satisfy the condition of $|R| \leq 0.3$ percent in the regions adjacent to the visible region and the region or band including the central wavelength.

In order that the layer $3/2\ \lambda$ in thickness may have a refractive index from 1.45 to 1.5 in the regions adjacent to the visible region, the characteristics of the quasi-symmetrical coating must be utilized. One of the arrangements is $$ng\text{-}\lambda/4\text{-}\lambda/2\text{-}\lambda/2\text{-}\lambda/4\text{-air} \quad (T\text{-}1)$$

where $ng$ = glass to be coated; and
($n = 1.52$)

The first layer of $MgF_2$ which is $\lambda/4$ in thickness and is made in contact with the air and the fifth layer of $Al_2O_3$ which is $\lambda/4$ in thickness with a refractive index of 1.6 and is made upon the glass are assumed in conjunction with a physically and chemically stable substance satisfying the conditions of $|R| < 0.3$ percent in the region near the central wavelength.

In order to further improve the reflectivity in the region or band near 6,000 A., a layer $\lambda$ in thickness with a refractive index $n$ less than that ($n = 1.52$) of the glass $ng$ between the latter and the layer with a refractive index of 1.6. This arrangement will be shown by $$ng\text{-}\lambda/4\text{-}\lambda/2\text{-}\lambda/4\text{-}\lambda/4\text{-}\lambda/2\text{-}\lambda/4\text{-air} \quad (T\text{-}2)$$

in terms of the quasi-symmetrical three-layer coating. In this arrangement, the first layer in contact with the air is $MgF_2$ $\lambda/4$ in thickness, the second layer is $TiO_2$ $\lambda/2$ in thickness with a refractive index of 2.0 - 2.1 and the third layer is $Al_2O_3$ $\lambda/4$ in thickness with a refractive index of 1.6.

Figure 10:
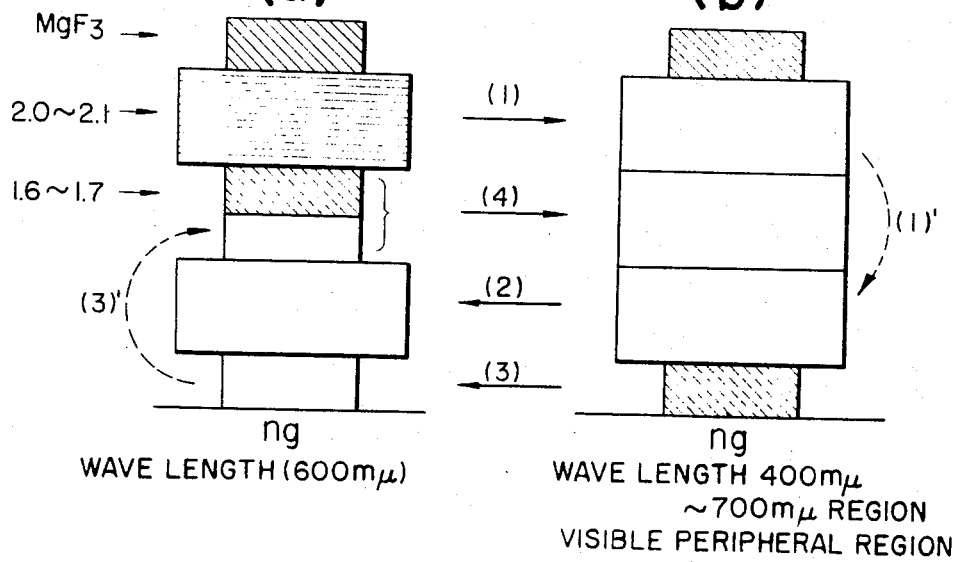

A new system satisfying the above two conditions may be obtained from the steps shown in a block diagram in FIG. 10 as follows:

$$ng\text{-}\lambda/4\text{-}\lambda/2\text{-}\lambda/2\text{-}\lambda/2\text{-}\lambda/4\text{-air} \quad (T\text{-}3)$$

Figure 3:
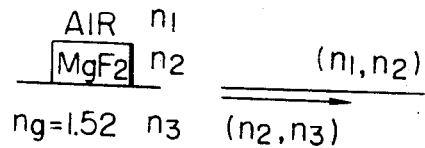
FIG. 3(a) is an explanatory view illustrating by vector method the reflectivity to central wavelength of 500 mµ and a region less than 0.3 percent of the MgF$_2$ layer λ/4 in thickness over a glass with a refractive index of 1.5.
FIG. 3(b) is an explanatory view illustrating by vector method the necessity of interposing a layer λ/4 in thickness between the MgF$_2$ layer and the glass in order to reduce the reflectivity less than 0.3 percent.
Figure 3:
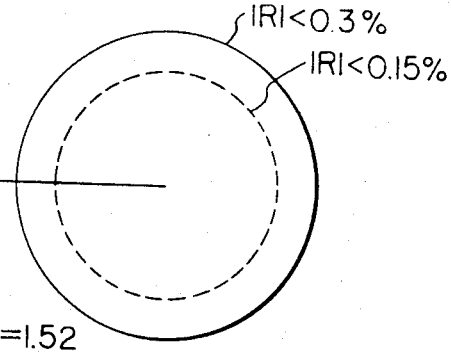
Figure 3:
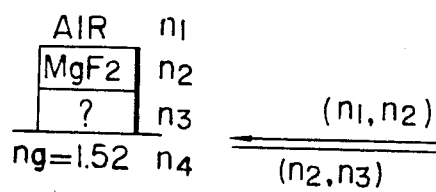
Figure 3:
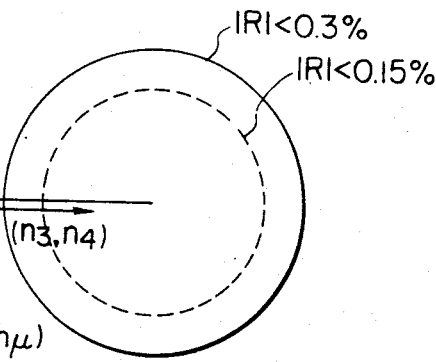

It is noted that the first layer in contact with the air is a $MgF_2$ layer $\lambda/4$ in thickness as is clear from FIG. 3 and the second layer must be a layer $\lambda/2$ in thickness with the same refractive index as that of the $TiO_2$ layer from (T-2). When the fourth and second layers are symmetrical, the fourth layer may be a layer $\lambda/2$ in thickness with a refractive index of 2.0. Similarly, in order that the fifth layer in (T-1) may coincide with the sixth layer in (T-2), the third layer is a layer of $Al_2O_3$, etc., $\lambda/2$ in thickness with a refractive index of 1.6 because of the fourth layer of $Al_2O_3$, etc., $\lambda/4$ in thickness in consideration of the facts that the fifth layer (interposed between the glass and the adjacent layer) is a layer of $Al_2O_3$, etc., $\lambda/4$ in thickness with a refractive index of 1.6, and that the third layer in (T-2) is a layer of $Al_2O_3$, etc., $\lambda/4$ in thickness with a refractive index of 1.6.

Figure 11:
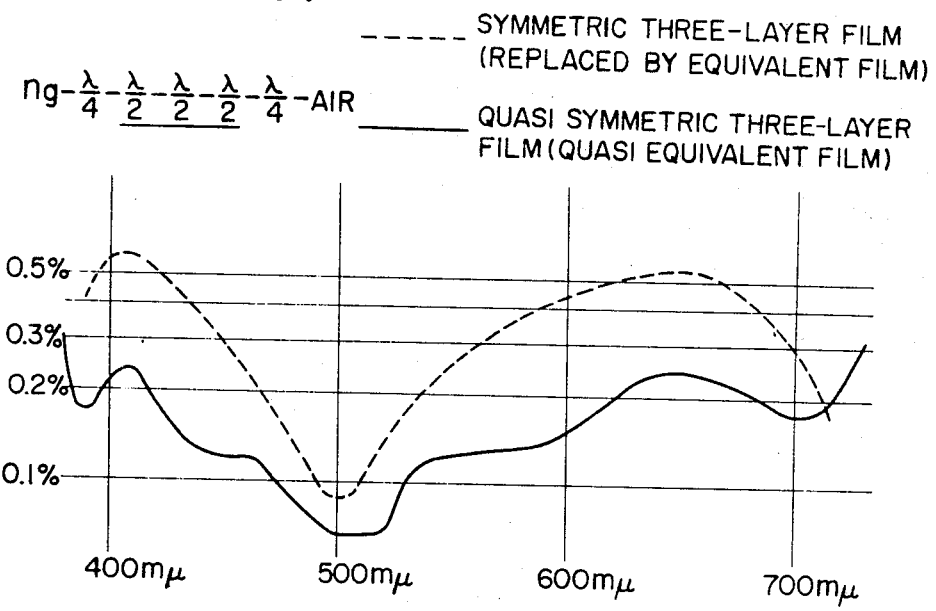
FIG. 11 shows the spectral reflectivity of the first embodiment in comparison with that of the prior art symmetrical three-layer coating.

That is, $ng$-(about 1.6)-(about 2.0)-(about 1.6)-(about 2.0)-
$\quad\ \ \lambda/4 \quad\quad\ \lambda/2 \quad\quad\ \lambda/2 \quad\quad\ \lambda/2$ (about 1.39)-air
$\quad\ \ \lambda/4$ The spectral reflectivity of the system obtained by the combination of these three symmetrical three-layer coatings is shown by the dotted line in FIG. 11.

The asymmetry is introduced into the system approximately constructed by the symmetrical three-layer coatings so that the refractive index at 6,000 A. of the layer $\lambda$ in thickness and adjacent to the glass and the refractive index corresponding to that of the intermediate layer $3/2\ \lambda$ in thickness in the regions adjacent to the visible region may be reduced. When the asymmetrical component ratios of $\Delta n/n \approx 0.05$ for the layer adjacent to the glass and $\lambda$ in thickness and $\Delta n/n \approx 0.05 - 0.1$ for the intermediate layer are introduced, the reflectivity shown by the solid line in FIG. 11 is obtained so that the condition of $|R| < 0.3$ percent may be attained in the whole visible region.

SECOND EMBODIMENT

Figure 12:
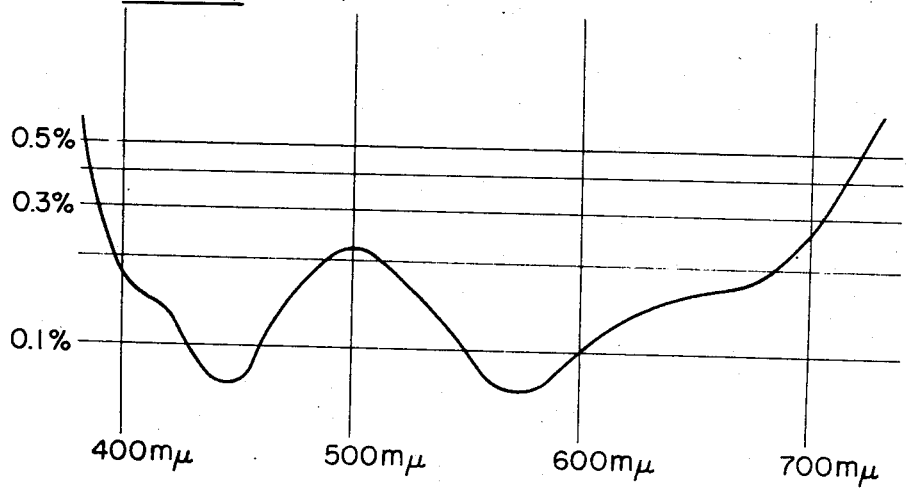
FIG. 12 shows the spectral reflectivity of a second embodiment of the present invention.

The second embodiment is a system
$ng\text{-}\lambda/4\text{-}\lambda/4\text{-}\lambda/4\text{-}\lambda/2\text{-}\lambda/4\text{-air}$
obtained in a similar manner and the third, fourth and fifth layers, each $\lambda/4$ in thickness constitutes a quasi-symmetrical three-layer coating. The spectral reflectivity is shown in FIG. 12 and is excellent as compared with the conventional antireflection coating.

THIRD EMBODIMENT

Figure 13:
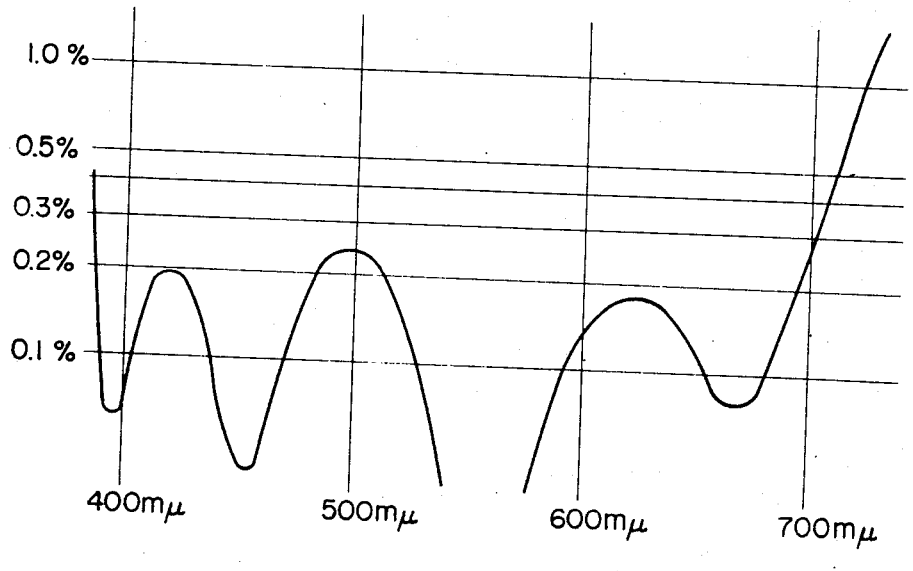
FIG. 13 is a spectral reflectivity of a third embodiment of the present invention.

The third embodiment is a system
$ng\text{-}\lambda/2\text{-}\lambda/2\text{-}\lambda/2\text{-}\lambda/4\text{-air}$
obtained in a similar manner, and the refractive index of the glass is 1.74. The second, third and fourth layers each $\lambda/2$ in thickness constitute the quasi-symmetrical three-layer coating. The spectral reflectivity is shown in FIG. 13 and the antireflection coating of the third embodiment has an excellent characteristic in the visible region.

The theory of the quasi-symmetrical three-layer coating discussed so far may be further extended so that a layer having a refractive index substantially same as that of the glass may be assumed to be coated over the glass. Then, a quasi-symmetrical three-layer coating including this layer may be considered. In practice, however, this layer is included in the glass so that a number of layers may be minimized while the antireflection effect remains unchanged.

Figure 2:
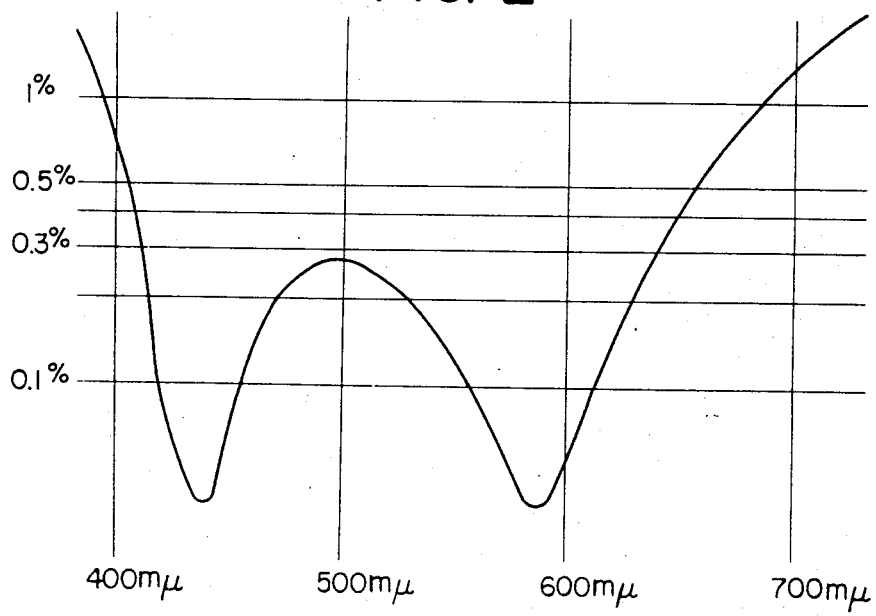
FIG. 2 is a graph of a spectral reflectivity of the prior art double-layer antireflection coating, 2 that is ( ng - λ/2 - λ/4 - air)

The double-layer (2HL type) antireflection coating for a glass having a high refractive index proposed by Hass is well known (See FIG. 2), but is not satisfactory from the standpoint of the characteristics in the whole visible region.

FOURTH EMBODIMENT

Figure 14:
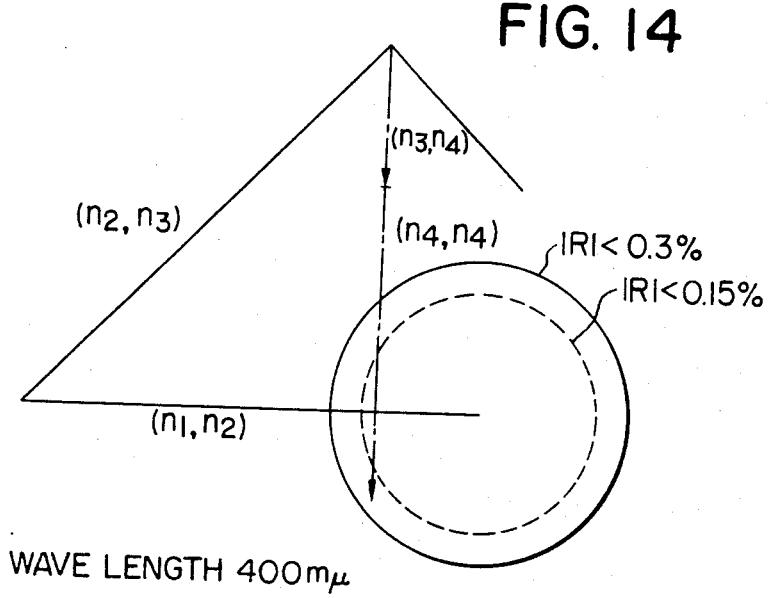
FIGS. 14 and 15 are diagrams illustrating in vector method the reflectivity at 400 mµ and 700 mµ and the regions less than 0.3 percent to improve the double-layer coating.
Figure 15:
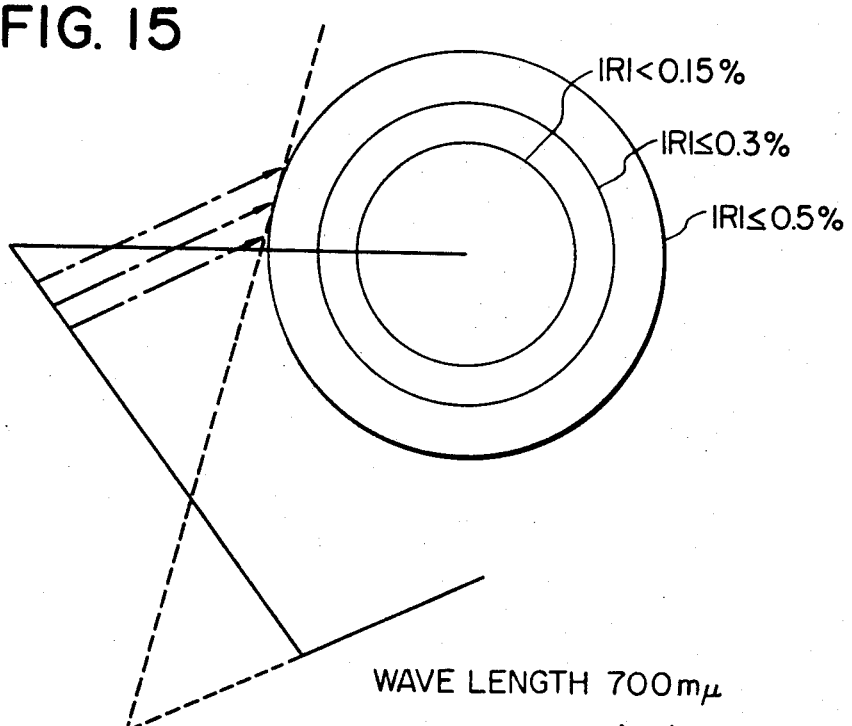

In order to improve the reflectivity in the regions adjacent to the visible region in a double-layer coating, the Hass's layer $\lambda/2$ in thickness is reduced to $\lambda/4$ in the region of 400 m$\mu$; a layer $\lambda$ in thickness with a high refractive index higher than 2.3 - 2.4 must be provided as the third layer below the layer $\lambda$ in thickness and in the region of 700 m$\mu$ the layer $3/2\ \lambda$ in thickness with a refractive index of 1.4 – 1.5 needs a layer λ/2 in thickness, as shown in FIGS. 14 and 15. In the region of 600 mμ, since the prior art double-layer coating satisfies the conditions of $|R| < 0.3$ percent, a layer which exhibits the same characteristics as in the region of 400 mμ must be introduced in order to satisfy the above-explained conditions in the visible region and to maintain the characteristics in the region of 600 mμ. Similarly, the introduction of an absent layer is required in the bands near to the central wavelength as in the case of the first embodiment. When these conditions are satisfied, the V- or W-shaped reflectivity curve of the prior art coating may be improved. To attain these layers 3/2 λ and λ in thickness respectively, the first layer in the above-described equivalent coating and quasi-symmetrical three-layer coating, may be a layer λ/2 or λ/4 in thickness with a refractive index substantially equal to that of the glass; the refractive index of a layer λ/2 or λ/4 in thickness below a $MgF_2$ layer is fixed to 2.0 – 2.1; and the intermediate layer λ/2 may be optimized. Then the system $$ng\text{-}\lambda/2\text{-}\lambda/2\text{-}\lambda/4\text{-air}$$

Figure 16:
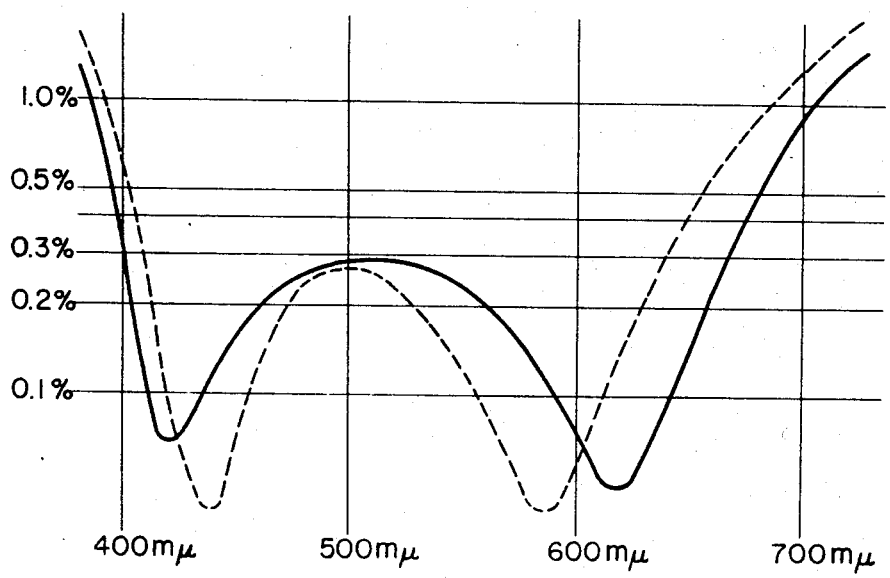
FIG. 16 shows the spectral reflectivity of the fourth embodiment of the present invention in comparison with the prior art double-layer coating.
Figure 17:
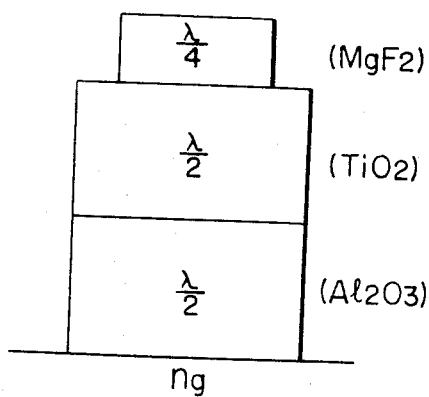
FIG. 17 shows the construction of the fourth embodiment.

(T-4)

may be attained. As is clear from FIG. 3, the first layer adjacent to the air is assumed to be a layer of $MgF_2$, λ/4 in thickness; the second layer has a refractive index of 2.0 – 2.1, that is a layer of $TiO_2$, $ZrO_2$, etc., λ/2 in thickness because of the reasons described above; the third layer is a layer of $Al_1O_3$, $CeF_3$, etc., λ/2 in thickness with a refractive index of 1.6; and the refractive index of the glass is within the range $|(ng - n_2)/n_2| < 0.15$, that is $ng > 1.7$. The reflectivity $R(\lambda)$ is indicated by the solid line in FIG. 16, while the dotted line represents the reflectivity of the prior art double-layer coating. FIG. 17 illustrates the construction.

FIFTH EMBODIMENT

A system of the fifth embodiment $$ng\text{-}\lambda/2\text{-}\lambda/2\text{-}\lambda/2\text{-}\lambda/4\text{-air}$$

Figure 20:
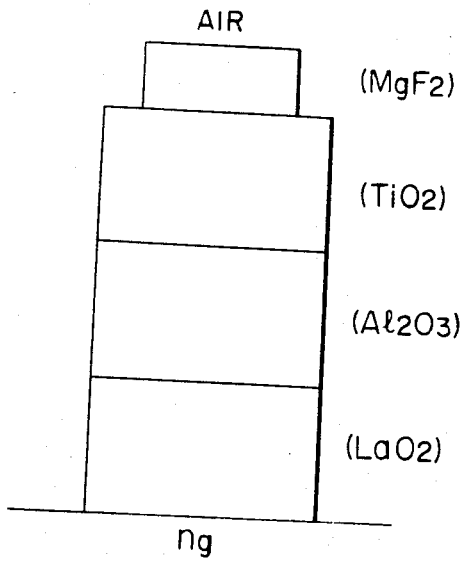
FIG. 20 is a diagram illustrating the construction of the fifth embodiment.
Figure 19:
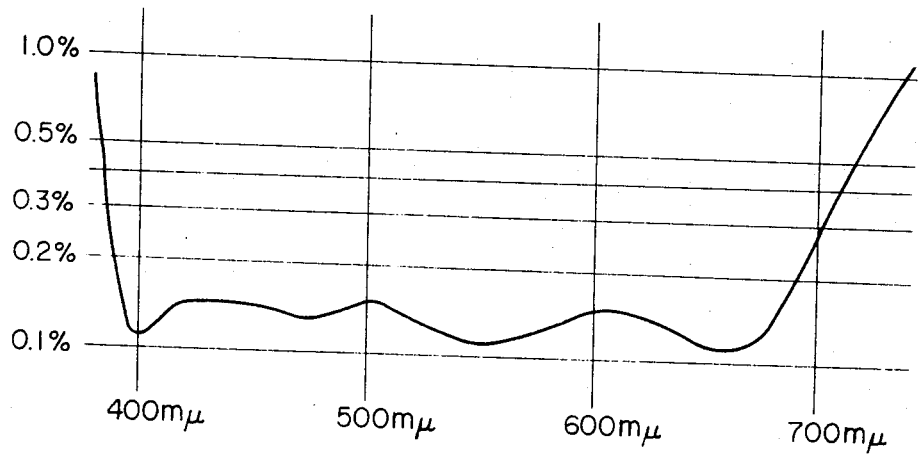
FIG. 19 shows the spectral reflectivity of the fifth embodiment.

(T-5)

is obtained in order to improve the fourth embodiment so as to have the reflectivity $|R| < 0.3$ percent in the whole visible region. The reflectivity at 400 and 700 mμ are shown in FIG. 18 in terms of the vector method. In this case, as is clear from FIG. 18, a layer λ/2 in thickness with a refractive index of 2.0 – 2.1 and a layer 3/2 λ in thickness with a refractive index of 1.5 for compensating the said layer μ/2 in thickness are required in order to reduce the reflectivity less than 0.3 percent in the regions adjacent to 4,000 and 7,000 A. In the fifth embodiment, one layer in the quasi-symmetrical three-layer coating is substituted by the refractive index of the glass, thereby decreasing a number of layers. That is, the first layer adjacent to the air is a layer of $MgF_2$, λ/4 in thickness; the second layer is a layer in λ/2 in thickness and made of $TiO_2$, $ZrO_2$, $ThO_3$, $CeO_3$, etc.; the third layer is a layer λ/2 in thickness with a refractive index of 1.6 and made of $Al_2O_3$, MgO, $CeF_3$, etc.; and the fourth layer is a $LaO_3$ layer λ/2 in thickness in contact with the glass with $|(ng - n_3)/n_3| < 0.15$ so that the reflectivity $|r| < 0.3$ percent in the whole visible region. The reflectivity is shown in FIG. 19 while its construction, in FIG. 20.

In case of the refractive index of the glass to be coated in $ng < 1.6$ or $ng > 1.7$, the satisfactory results may be attained when the above described two conditions are fulfilled as in the case of the above two embodiments. In case of the glass having a refractive index of the order of 1.6, that is in case of the most widely used glass, the antireflection coating designed for the glass having a refractive index of 1.52 or 1.74 may not be effective. However, the present inventor discovered that it is possible to correct the refractive index of a glass to be coated by overlaying or depositing in vacuum a suitable layer. That is, it was discovered that an excellent antireflection coating for overall visible range may be provided for glasses having various refractive indices by forming a layer which converts a glass with an intermediate refractive index of 1.6 into a glass having a refractive index of about 1.52 or higher than 1.7 and then forming the layers which are designed in a similar manner as described hereinbefore. That is, when the refractive index of a glass to be coated is $n$ and the thickness of a layer over the glass is $nd/\lambda_s$, the glass has an equivalent refractive index $$\tilde{n}o = n^2/ng$$

(13)

for the wavelength $\lambda_o$ having $nd/\lambda_s \cdot \lambda_s/\lambda = \frac{1}{4}$ because of the adjacent layer.

When the equivalent refractive index of the glass is $n'$ in the visible region for $\lambda_s = \lambda_o$ because of its adjacent layer, the following relation is held:

$$(n' - 1/n' + 1)^2 \approx (ro + 1)^2 + k/(a^2 + k)$$

(14)

where $a = n + ng/n$;

$$k = (n^2 - 1)(ng^2 - n^2) 1/n^2 \times \cos^2 g$$

(15)

$$g = 2\pi \cdot nd/\lambda_s \cdot \lambda_s/\lambda$$

That is, when a layer λ/4 in thickness is suitably introduced, the glass and its adjacent layer λ/4 in thickness have an effect of a glass having an equivalent refractive index of $n^2/ng$. It is also seen that this refractive index sufficiently varies in the regions adjacent to the visible region from Eq. (14).

SIXTH EMBODIMENT

For instance, when $ng = 1.65$ and a layer λ/4 in thickness with a refractive index of about 1.68 – 1.7 is formed, the glass has an equivalent index of 1.74 because of this layer. In a similar manner as in the case of the embodiments described hereinabove, a system $$ng\text{-}\lambda/4\text{-}\lambda/4\text{-}\lambda/4\text{-}\lambda/2\text{-}\lambda/4\text{-air}$$

(T-6)

may be provided. In this case, by simplifying the fifth layer and the sixth layer adjacent to the glass, the system may be $$ng\text{-}\lambda/2\text{-}\lambda/4\text{-}\lambda/4\text{-}\lambda/2\text{-}\lambda/4\text{-air}$$

Figure 21:
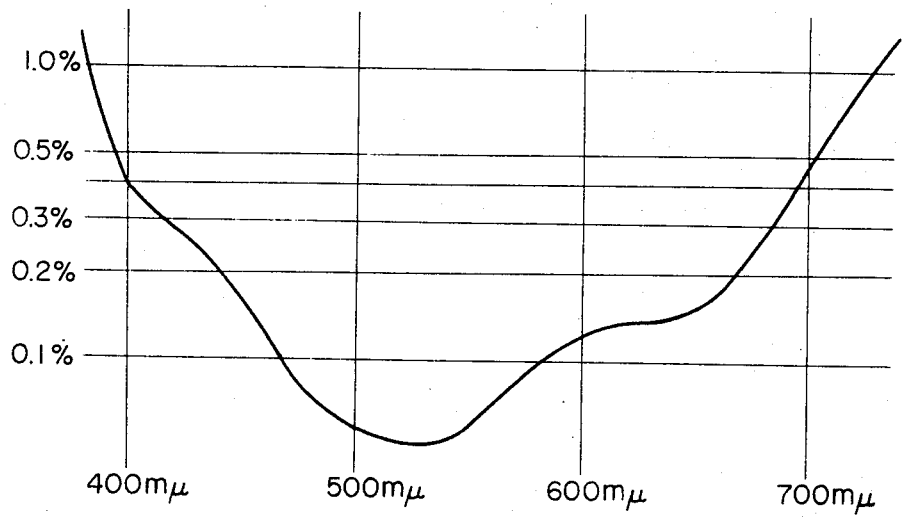
FIG. 21 shows the spectral reflectivity of a sixth embodiment of the present invention.
Figure 22:
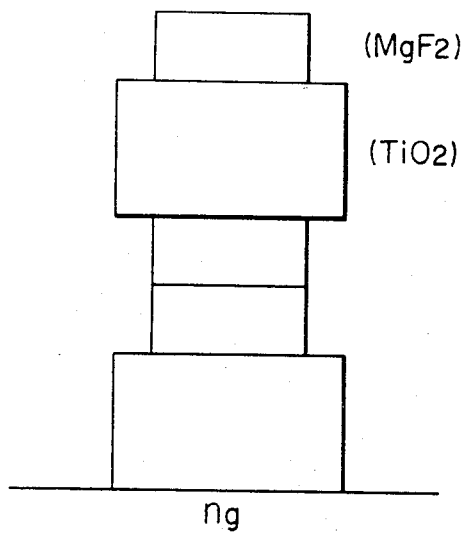
FIG. 22 is a diagram illustrating the construction thereof.

(I-7)

and the sufficient antireflection effect may be attained in case of the glass having a refractive index of the order of 1.65. The first layer adjacent with the air is a layer of $MgF_2$, cryolite, etc., λ/4 in thickness with a refractive index of 1.39. The second layer is a layer in λ/2 in thickness and made of $TiO_2$, $ZrO_2$, $ThO_3$, $CeO_3$, etc. The third, fourth and fifth layers constituting a quasi-symmetrical three-layer coating with a refractive index of 1.8 – 1.85 are λ/4 in thickness in order to attain a wide variance in the visible region. The third layer is made of $AL_2O_3$, etc., with λ/4 thickness; the fourth layer, CeF, etc., of λ/4 thickness; and the fifth layer, MgO $Al_2O_3$, etc., and consists of two layers each λ/4 in thickness, one for constituting the quasi-symmetrical three-layer coating while the other layer adjacent to the glass corrects the refractive index of the glass to be coated. The antireflection coating thus formed has an excellent antireflection effect and its reflectivity and construction are illustrated in FIGS. 21 and 22 respectively.

SEVENTH EMBODIMENT

The seventh embodiment is an example of an antireflection coating which is designed for instance in accordance with the U.S. Pat. No. 3,185,020 for use with a glass having a refractive index of 1.52 and is added with a layer which converts the refractive index of the glass into 1.52 so that the antireflection coating may be applied to the glasses having refractive indices other than 1.52.

For instance, in case of a glass having $ng = 1.67$, the system is $$ng - λ/4-λ/4-λ/2-λ/4-air$$
$$1.67 \qquad\qquad\qquad (T-7)$$

Figure 23:
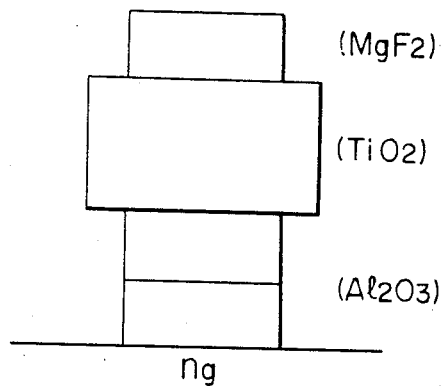
FIG. 23 is a diagram illustrating a seventh embodiment in accordance with the present invention.
Figure 24:
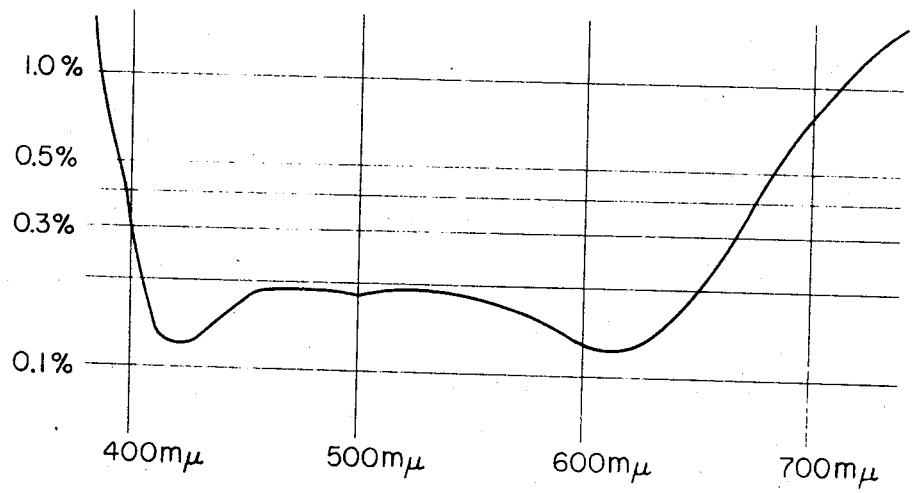
FIG. 24 shows the spectral reflectivity thereof.

The first layer is a layer made of $MgF_2$, cryolite, etc. λ/4 in thickness with a refractive index of about 1.39 – 1.35. The second layer is a layer λ/2 in thickness with a refractive index of 2.0 – 2.1 made of $TiO_2$, $ZrO_2$, $ThO_3$, etc. The third layer is a layer λ/4 in thickness made of $AL_2O_3$, etc. The fourth layer is a layer λ/4 in thickness of a substance such as $CeF_2$ for correcting the refractive index 1.67 of the glass to 1.52. Thus, in the visible region, the same effect as in the case of the three-layer coating for the glass with $ng = 1.52$ may be attained. In this case, as is clear from Eq. (14), the effect of dispersion in the regions adjacent to the visible region is added so that the antireflection effect in the visible region is excellent as compared with the prior art three-layer coating. FIG. 23 illustrates the construction while FIG. 24, the reflectivity.

From the foregoing description, it is seen that an equivalent refractive index $N$ having a wide dispersion effect in the regions adjacent to the visible region may be obtained by introducing a quasi-symmetrical three-layer coating consisting of various substances which may be Al deposited in vacuum in a stable manner. It may be possible to substitute one layer of a quasi-symmetrical three-layer coating by a glass to be coated. When the refractive index of a glass to be coated is not 1.52 or 1.74, the prior art antireflection coatings designed for the glasses with refractive index 1.52 or 1.74 may be applied to the glass with a refractive index other than 1.52 or 1.74 by forming a suitable layer λ/4 in thickness over the glass. Thus, the excellent antireflection coatings for the whole visible region and glasses with various refractive indices may be provided. What is claimed is:

1. In an optical component including a transparent glass body having an index of refraction designated as $n_g$ and having an antireflection coating on one surface thereof, the improvement wherein said antireflection coating comprises four layers of material having optical thicknesses not less than one-quarter of the central wave length $λ_s$ of the coating; the first layer adjacent to the air having an optical thickness of λ/4 and refractive index $n_1$ of less than 1.39, the second layer adjacent to said first layer having an optical thickness of λ/2 and refractive index $n_2$ of about 2.0, the third layer adjacent to the second layer having a refractive index $n_3$ of about 1.60 and an optical thickness of λ/2, and the fourth layer disposed between the third layer and the glass body and having a refractive index $n_4$ and an optical thickness of λ/2, and wherein said glass body and said third and fourth layers form a quasi-symmetrical three layer antireflection member, and said component satisfies the following conditions $$Δn_3/n_3 < 0.15$$
$$2n_3d_3 = n_4d_4 = m/4\, λ_s\ (m = 1, 2 \ldots)$$
$$n_3d_3 = n_4d_4$$

where $Δn_3$ is the difference between index $n_3$ of the third layer and index $n_g$ of the glass body, $d_3$ and $d_4$ designate actual thicknesses of the third and fourth layers, and $n_3d_3/λ_s$ and $n_4d_4/λ_s$ designate the optical thicknesses of the third and fourth layers respectively.

2. In an optical component including a body having at least one surface through which light is transmissible, and having an antireflection coating on said one surface, the improvement wherein said anireflection coating comprises five layers of material having optical thicknesses not less than one-quarter of the central wave length $λ_s$ of the coating; the first layer adjacent to the air having an optical thickness of λ/4 and refractive index $n_1$ of less than 1.39, the second layer adjacent to said first layer having an optical thickness of λ/2 and refractive index $n_2$ of about 2.0, the third and fifth layers having refractive indices of about 1.60 and respective different optical thicknesses, wherein the third layer is disposed adjacent the second layer, the fifth layer is disposed on said one surface of said body, and the fourth layer is disposed between the third and fifth layers; and wherein said third to fifth layers form a quasi-symmetrical three layer anti-reflection member, and said component satisfies the following conditions $$Δn_3/n_3 < 0.2$$
$$2n_3d_3 + n_4d_4 = m/4\, λ_s\ (m = 1, 2 \ldots)$$
$$n_3d_3 = n_4\, d_4$$

where $Δn_3$ is the difference between index $n_3$ of the third layer and index $n_5$ of the fifth layer, $d_3$ and $d_4$ designate actual thicknesses of the third and fourth layers, and $n_3d_3/λ_s$ and $n_4d_4/λ_s$ designate the optical thicknesses of the third and fourth layers respectively.

3. An optical component according to claim 2, wherein optical thicknesses of the third, fourth and fifth layers are λ/2, λ/2 and λ/4 respectively, the fourth layer has a refractive index of about 2.0, $Δn_3/n_3$ is about 0.05 and the second, third and fourth layers form a second quasi-symmetrical three-layer member satisfying the relationship $Δn_2/n_2 = 0.05 \sim 0.10$, where $Δn_2$ is the difference between index $n_2$ and $n_4$.

4. An optical component according to claim 2, wherein the optical thicknesses of the third, fourth and fifth layers are λ/4, λ/4 and λ/2 respectively, and the fourth layer has a refractive index of about 1.60.

5. In an optical component including a body having at least one surface through which light is transmissible, and having an antireflection coating on said one surface, the improvement wherein said antireflection coating comprises at least four layers of material having optical thicknesses not less than one-quarter of the central wavelength $\lambda_s$ of the coating; wherein three successive layers of said coating form a quasi-symmetrical three-layer antireflection coating, said three successive layers having respective refraction indices $n_1$, $n_2$, and $n_3$; wherein said indices of the first and third layers of said three successive layers satisfy the relationship $$\Delta n_1/n_1 < 0.2,$$

where $\Delta n_1$ is the difference between index $n_1$ of the first layer and index $n_3$ of the third layer; and wherein said antireflection coating satisfies the following conditions $$2n_1 d_1 + n_2 d_2 = m/4 \lambda_s \ (m + 1, 2, \ldots),$$

$$n_1 d_1 = n_2 d_2, \text{ and}$$

$$|\cos g| \approx (n_1/n_1 + n_2),$$

where $d_1$ and $d_2$ designate actual thicknesses of the first and second layers of said three successive layers, $n_1 d_1/\lambda_s$ and $n_2 d_2/\lambda_s$ designate the optical thicknesses of the first and second layers, respectively, $\lambda_s$ is a central wavelength, $g=(2\pi n_1 d_1/\lambda_s) \lambda_s/\lambda$ and $\lambda$ is an arbitrarily chosen wavelength adjacent to the visible range centered at $\lambda_s$.

6. In an optical component including a body having at least one surface through which light is transmissible, and having an anti-reflection coating on said one surface, the improvement wherein said antireflection coating comprises at least four layers of material having optical thicknesses not less than one-quarter of the central wavelength $\lambda_s$ of the coating; wherein three successive layers of said coating form a quasi-symmetrical three-layer antireflection coating, said three successive layers having respective refraction indices $n_1$, $n_2$, and $n_3$; wherein said indices of the first and third layers of said three successive layers satisfy the relationship $$\Delta n_1 n_1 < 0.2,$$

where $\Delta n_1$ is the difference between index $n_1$ of the first layer and index $n_3$ of the third layer; and wherein said anti-reflection coating satisfies the following conditions $$2n_1 d_1 + n_2 d_2 = m/4 \lambda_s \ (m = 1, 2, \ldots),$$

$$2n_1 d_1 = n_2 d_2, \text{ and}$$

$$|\tan g| \approx n_2/n_1,$$

where $d_1$ and $d_2$ designate actual thicknesses of the first and second layers of said three successive layers, $n_1 d_1/\lambda_s$ and $n_2 d_2/\lambda_s$ designate the optical thicknesses of the first and second layers, respectively, $\lambda_s$ is a central wavelength, $g=(2\pi n_1 d_1/\lambda_s) \lambda_s/\lambda$ and $\lambda$ is an arbitrarily chosen wavelength adjacent to the visible range centered at $\lambda_s$.

7. In an optical component including a body having at least one surface through which light is transmissible, and having an anti-reflection coating on said one surface, the improvement wherein said antireflection coating comprises at least four layers of material having optical thicknesses not less than one-quarter of the central wavelength $\lambda_s$ of the coating; wherein three successive layers of said coating form a quasi-symmetrical three-layer antireflection coating, said three successive layers having respective refraction indices $n_1$, $n_2$, and $n_3$; wherein said indices of the first and third layers of said three successive layers satisfy the relationship $$\Delta n_1/n_1 < 0.2,$$

where $\Delta n_1$ is the difference between index $n_1$ of the first layer and index $n_3$ of the third layer; and wherein said anti-reflection coating satisfies the following conditions $$2n_1 d_1 + n_2 d_2 = m/4 \lambda_s \ (m = 1, 2, \ldots),$$

$$n_1 d_1 = 2 n_2 d_2, \text{ and}$$

$$\cos g \approx (1 + (n_2)/(n_1+n_2)^2)^{1/2} n_2/n_1 n_2,$$

where $d_1$ and $d_2$ designate actual thicknesses of the first and second layers of said three successive layers, $n_1 d_1/\lambda_s$ and $n_2 d_2/\lambda_s$ designate the optical thicknesses of the first and second layers, respectively, $\lambda_s$ is a central wavelength, $g=2\pi n_1 d_1/\lambda_s) \lambda_s/\lambda$ and $\lambda$ is an arbitrarily chosen wavelength adjacent to the visible range centered at $\lambda_s$.

* * * * *